United States Patent
Wako et al.

(10) Patent No.: US 12,147,011 B2
(45) Date of Patent: Nov. 19, 2024

(54) OPTICAL LAMINATE HAVING ALUMINUM OR INDIUM ADHESION LAYER

(71) Applicant: DEXERIALS CORPORATION, Shimotsuke (JP)

(72) Inventors: Hitoshi Wako, Shimotsuke (JP); Izumi Kida, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 0 days.

(21) Appl. No.: 18/019,869

(22) PCT Filed: Nov. 26, 2021

(86) PCT No.: PCT/JP2021/043465
§ 371 (c)(1),
(2) Date: Feb. 6, 2023

(87) PCT Pub. No.: WO2022/114146
PCT Pub. Date: Jun. 2, 2022

(65) Prior Publication Data
US 2023/0228913 A1    Jul. 20, 2023

(30) Foreign Application Priority Data

Nov. 30, 2020 (JP) .................. 2020-198569
Oct. 1, 2021 (JP) .................. 2021-162899

(51) Int. Cl.
*B32B 7/023* (2019.01)
*G02B 1/115* (2015.01)

(52) U.S. Cl.
CPC .............. *G02B 1/115* (2013.01); *B32B 7/023* (2019.01); *B32B 2309/105* (2013.01)

(58) Field of Classification Search
CPC ......... G02B 1/11–118; G02F 1/133502; G02F 2201/38
See application file for complete search history.

(56) References Cited

U.S. PATENT DOCUMENTS 6,507,337 B1    1/2003 Sato et al.
2004/0076835 A1*  4/2004 Watanabe .............. G02B 1/11
                                                            428/432
(Continued)

FOREIGN PATENT DOCUMENTS

CN    101233434 A    7/2008
JP    H07-166328 A   6/1995
(Continued)

OTHER PUBLICATIONS

International Search Report issued Dec. 28, 2021 in PCT/JP2021/043465 (with English translation).
(Continued)

*Primary Examiner* — Ryan S Dunning
(74) *Attorney, Agent, or Firm* — Element IP, PLC

(57) ABSTRACT

This optical laminate includes a transparent substrate; an adhesion layer provided on at least one surface of the transparent substrate; and an optical layer provided on a surface of the adhesion layer on a side opposite to the transparent substrate, wherein the adhesion layer is formed of a metal material, and the metal material has a melting point in a range of 100° C. or more and 700° C. or less.

20 Claims, 1 Drawing Sheet

(56) References Cited

U.S. PATENT DOCUMENTS

| | | | |
|---|---|---|---|
| 2006/0132922 A1* | 6/2006 | Takao | G02B 5/0242 |
| | | | 359/488.01 |
| 2007/0102737 A1 | 5/2007 | Kashiwabara et al. | |
| 2011/0014442 A1 | 1/2011 | Serrano et al. | |
| 2012/0187399 A1 | 7/2012 | Fukuda et al. | |
| 2014/0063608 A1 | 3/2014 | Ogo et al. | |
| 2015/0064411 A1 | 3/2015 | Sasai et al. | |
| 2018/0148609 A1* | 5/2018 | Ono | B32B 9/00 |
| 2021/0255365 A1* | 8/2021 | Tao | G02B 1/14 |

FOREIGN PATENT DOCUMENTS

| | | | |
|---|---|---|---|
| JP | 2000085051 A | 3/2000 | |
| JP | 2001264511 A | 9/2001 | |
| JP | 2002311204 A | 10/2002 | |
| JP | 2003094546 A | 4/2003 | |
| JP | 2004309711 A | 11/2004 | |
| JP | 2005319632 A | 11/2005 | |
| JP | 2006168298 A | 6/2006 | |
| JP | 2007271860 A | 10/2007 | |
| JP | 2008275737 A | 11/2008 | |
| JP | 2009067958 A | 4/2009 | |
| JP | 2011512553 A | 4/2011 | |
| JP | 2012206307 A | 10/2012 | |
| JP | 2012206367 A | 10/2012 | |
| JP | 2012206382 A | 10/2012 | |
| JP | 2014034701 A | 2/2014 | |
| JP | 6207679 B2 | 10/2017 | |
| JP | 2018079599 A | 5/2018 | |
| JP | 7213323 B2 | 1/2023 | |
| KR | 20190019069 A | 2/2019 | |
| KR | 20200022029 A | 3/2020 | |
| WO | WO-2011040440 A1 | 4/2011 | |
| WO | WO-2012133216 A1 | 10/2012 | |
| WO | WO-2013168592 | 11/2013 | |

OTHER PUBLICATIONS

Office Action issued Aug. 16, 2022 in Japanese Patent Application No. 2021-162899 (with English translation).

Office Action issued Feb. 22, 2022 in Japanese Patent Application No. 2021-162899 (with English translation).

Office Action issued Jan. 10, 2023 in Japanese Patent Application No. 2021-162899 (with English translation).

Office Action issued Jan. 4, 2022 in Japanese Patent Application No. 2021-162899 (with English translation).

Office Action issued Jul. 22, 2022 in Japanese Patent Application No. 2021-162899 (with English translation).

Office Action issued Feb. 17, 2023 in Korean Patent Application No. 10-2023-7004194 (with English translation), 8 pages.

Combined Taiwanese Office Action and Search Report issued Jan. 30, 2023 in Patent Application No. 110144651 (with English translation), 13 pages.

Office Action issued Jun. 1, 2021 in Japanese Patent Application No. 2020-198569 (with English translation), 6 pages.

Combined Chinese Office Action and Search Report issued Jul. 7, 2023 in Patent Application No. 202180056661.4 (with English translation), 18 pages.

Office Action issued Jun. 1, 2023 in Korean Patent Application No. 10-2023-7004194 (with English translation), 6 pages.

Written Opinion issued Dec. 28, 2021 in PCT/JP2021/043465 (with English translation), 8 pages.

Office Action issued Apr. 8, 2024 in Korean Patent Application No. 10-2023-7041809 (with English translation), 8 pages.

* cited by examiner

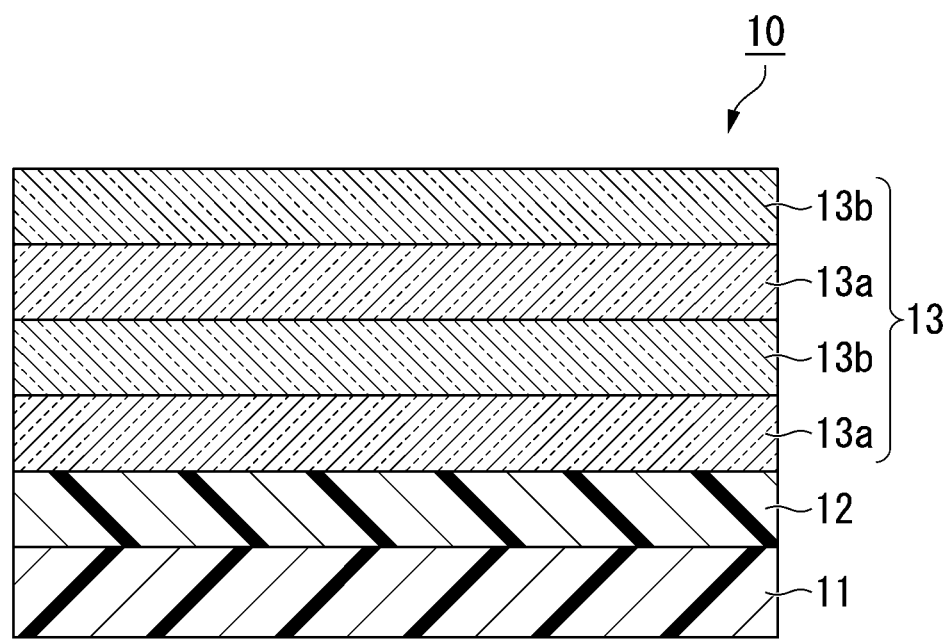

OPTICAL LAMINATE HAVING ALUMINUM OR INDIUM ADHESION LAYER

TECHNICAL FIELD

The present invention relates to an optical laminate and an article having the same.

Priority is claimed on Japanese Patent Application No. 2020-198569, filed Nov. 30, 2020 and Japanese Patent Application No. 2021-162899, filed Oct. 1, 2021, the contents of which are incorporated herein by reference.

BACKGROUND ART

In the related art, an optical multilayer film in which a plurality of transparent materials having a thickness approximately equal to a wavelength of light are laminated has been applied in various fields. In particular, an antireflection film that reduces reflection of light at a surface thereof by shifting a reflection phase, a wavelength selective film that transmits or reflects only a specific wavelength, and the like have been applied to camera lenses and window glass. In addition, display contents of displays such as television sets sometimes become difficult to be seen due to the reflection of external light, and the visibility can be improved by attaching an antireflection film.

With the progress of electronic technology in recent years, displays have been increasingly installed in portable devices, and high-definition displays have been installed in laptop computers, smartphones, and the like. Furthermore, recently, the use of IT in vehicles has progressed, and not only speedometers of the related art but also a large number of displays for displaying various items of information have been installed.

For such applications, weight reduction is desired from the viewpoint of portability, and it is desired to form an antireflection film on a film instead of the glass of the related art. In addition, even if the display is made of glass, in the unlikely event that it breaks, a film is attached to a surface of the glass to prevent scattering, and thus an anti-reflective film is often attached.

As a method for realizing an optical multilayer film, there are a wet method in which materials with different refractive indices are applied in the atmosphere and a dry method in which a film is formed by blowing a film-forming material in a vacuum. Although the wet method is convenient, the materials that can be applied are limited, and it is difficult to form a layer having the optical properties required for the optical multilayer film, and it is also difficult to laminate a large number of layers. On the other hand, the method of forming a film in a vacuum can laminate a wide variety of materials many times. There are several dry film forming methods, but, in particular, a sputtering method, which uses plasma in a vacuum, has various advantages such as being able to form a film even with materials with high melting points and ensuring film thickness uniformity and thus is widely used for forming an optical thin film.

In addition, when the sputtering method is used, a uniform film thickness distribution can be achieved for a long time. Therefore, a roll-to-roll sputtering apparatus obtained by combining this sputtering method with a film conveying apparatus can form a large area film at one time and thus has an industrial advantage.

However, in a case where the optical multilayer film is formed on the film, the film which is a substrate is made of a resin (a polymer), whereas the optical thin film forming the optical multilayer film is often made mainly of an oxide, and thus adhesion between the substrate and the thin film becomes an issue. In principle, a resin is an organic substance and has bonds mainly based on covalent bonds, whereas an oxide has ionic bonds. Therefore, bond types are different at an interface between the resin and the oxide, and thus a strong bond type cannot be obtained. In general, various adsorbed molecules adhere to a film surface, and the surface of the film itself does not emerge even when exposed to a vacuum. From an industrial point of view, accretion of dirt and the like on the film surface and unavoidably intentional application of a release agent and the like in the manufacture of the film are also factors in lowering adhesion.

Therefore, it becomes necessary to improve the adhesion between the resin substrate and the oxide. Various methods have been proposed, and examples of the methods include a method of increasing the physical adhesion using a so-called anchor effect for roughening the surface roughness, a method of wet-cleaning the film surface to remove dirt on the surface, and a method of introducing a polar group such as a hydroxyl group that easily bonds with the oxide onto the substrate surface in advance, and the like.

In addition, plasma treatment for removing dirt on the film surface by applying plasma to the film surface and forming polar groups and radicals on the film surface has advantages in that it does not cause a great change in surface roughness and does not include a process such as drying, and thus the plasma treatment is widely used. In particular, the above-mentioned roll-to-roll apparatus has many advantages such as being able to continuously form a thin film after the film is subjected to the plasma treatment (Patent Document 1).

Furthermore, introduction of an adhesion layer that mediates bonding between the resin and the oxide onto the film surface is also being studied. In particular, silicon has a metallic aspect, but a bond of the silicon is a covalent bond, and thus the silicon has a strong affinity with the resin. In addition, a hard coat containing an inorganic filler is often formed on the substrate in advance for the purpose of increasing a hardness of the surface and improving lubricity. $SiO_2$ is often used as the inorganic filler, and thus it is possible to bring about strong adhesion between the surface of the filler and the adhesion layer formed of silicon (Patent Document 2). Furthermore, there is an example in which silicon dioxide (SiOx: x=1 to 2) in a partially oxygen-deficient state obtained by introducing a very small amount of oxygen during silicon film formation to improve the optical properties while forming a thick adhesion layer is used (Patent Document 3).

CITATION LIST

Patent Document

[Patent Document 1]
Japanese Unexamined Patent Application, First Publication No. H7-166328
[Patent Document 2]
Japanese Patent No. 6207679
[Patent Document 3]
Japanese Unexamined Patent Application, First Publication No. 2003-094546

SUMMARY OF INVENTION

Technical Problem

However, in a case where the adhesion layer is formed by the sputtering method using silicon, there are problems in a process that it is difficult to stably discharge a target, and once a target surface is oxidized, the discharge cannot be sustained. In addition, in a case where SiOx is formed by introducing a very small amount of oxygen during silicon film formation, hysteresis in which a degree of the oxidation is not constant with respect to the amount of oxygen introduced and a state of the target surface depends on the amount of oxygen previously introduced is also observed, and thus it is extremely difficult to maintain film formation under the same conditions. Therefore, development of a technique capable of stably forming an adhesion layer that can stably and firmly adhere the transparent substrate and the optical layer to each other even in a case where a roll-to-roll sputtering process in which film formation can be continuously performed over a large area for a long time is used is required.

The present invention has been made in view of the above circumstances, and an object the present invention is to provide an optical laminate in which a transparent substrate and an optical layer are firmly adhered to each other and an article having the same.

Solution to Problem

In order to solve the above-described problems, the present inventors have made intensive studies and as a result, have found conditions under which the transparent substrate and the optical layer can be firmly adhered to each other using a metal material as an adhesion layer. That is, the present inventors have found that strong adhesion can be realized by forming an adhesion layer made of a metal material having a melting point of 700° C. or less between a substrate and an oxide.

Accordingly, in order to solve the above problems, the present invention provides the following means.

According to an aspect of the present invention, there is provided an optical laminate including: a transparent substrate; an adhesion layer provided on at least one surface of the transparent substrate; and an optical layer provided on a surface of the adhesion layer on a side opposite to the transparent substrate, wherein the adhesion layer is formed of a metal material, the adhesion layer has a thickness of 8 nm or less, and the metal material has a melting point in a range of 100° C. or more and 700° C. or less.

In the optical laminate according to the aspect of the present invention, the transparent substrate may be a resin film.

In the optical laminate according to the aspect of the present invention, the optical layer may be an oxide layer.

In the optical laminate according to the aspect of the present invention, the optical layer may be an alternate laminate in which high refractive index layers and low refractive index layers are alternately laminated.

The optical laminate according to the aspect of the present invention may have a transmittance of 91% or more for light with a wavelength of 550 nm.

According to another aspect of the present invention, there is provided an article including the optical laminate described above.

Advantageous Effects of Invention

According to the present invention, it is possible to provide an optical laminate in which a transparent substrate and an optical layer are firmly adhered to each other and an article having the same.

BRIEF DESCRIPTION OF DRAWINGS

FIG. 1 is a cross-sectional view showing an optical laminate according to a first embodiment of the present invention.

DESCRIPTION OF EMBODIMENTS

Hereinafter, the present embodiment will be described in detail with appropriate reference to the drawing. In the drawing used in the following description, characteristic portions may be enlarged for convenience to make it easier to understand the characteristics of the present invention, and the dimensional ratios of each component may differ from the actual ones. Materials, dimensions, and the like exemplified in the following description are examples, and the present invention is not limited to them and can be implemented with appropriate modifications of them within a scope exhibiting effects of the present invention.

FIG. 1 is a cross-sectional view showing an optical laminate according to a first embodiment of the present invention.

The optical laminate 10 of the present embodiment has an adhesion layer 12 and an optical layer 13 laminated in that order on one side of a transparent substrate 11.

The transparent substrate 11 only has to be formed from a transparent material that can transmit light in a visible light range, and for example, a resin film is preferably used as the transparent substrate 11. Although a material of the resin film is not particularly limited, for example, polyethylene terephthalate (PET), polyethylene naphthalate (PEN), polyaramid, polyimide, polycarbonate, polyethylene, polypropylene, triacetyl cellulose (TAC), polycycloolefin (COC, COP), or the like can be used.

A thickness of the transparent substrate 11 is not particularly limited, but in the case of a resin film, it is desirable to set the thickness to 20 μm or more and 200 μm or less in consideration of ease of handling during manufacturing and thinning of a member. Further, the transparent substrate 11 preferably has a transmittance of 80% or more for light in a wavelength range used. The light transmittance of the transparent substrate 11 is more preferably 88% or higher and particularly preferably 90% or higher.

The thickness of the transparent substrate 11 is preferably measured using a transmission electron microscope (TEM) on a cross section. This also applies to measurements of other layer thicknesses.

The light transmittance of the transparent substrate 11 is preferably measured using a haze meter (for example, NDH5000 (manufactured by Nippon Denshoku Industries Co., Ltd.)) in accordance with "JIS K-7105." This also applies to measuring the light transmittance of the optical laminate 10.

Moreover, from the viewpoint of improving scratch resistance of the optical laminate 10, at least one surface of the transparent substrate 11 may be provided with, for example, a coating. A resin, an inorganic substance, or a mixture thereof can be used as a material of the coating. Further, in a case where a resin coating is used as the coating, organic or inorganic particles may be dispersed inside the resin coating for the purpose of improving the haze and film running properties of the optical laminate 10. The resin coating may be formed by, for example, a solution coating method. In addition, the resin coating is provided on a surface of the transparent base material 11 on a side of the adhesion layer 12, thereby providing an auxiliary effect for improving adhesion between the transparent substrate 11 and the optical layer 13.

From the viewpoint of scratch resistance, examples of the resin coating include a coating provided as a hard coat layer. As a binder resin used for the hard coat layer, a transparent resin is preferable, and for example, an ionizing radiation-curable resin which is a resin cured with ultraviolet rays or electron beams, a thermoplastic resin, a thermosetting resin, or the like can be used.

Examples of the ionizing radiation-curable resin used as the binder resin of the hard coat layer include ethyl (meth) acrylate, ethylhexyl (meth)acrylate, styrene, methylstyrene, N-vinylpyrrolidone, and the like.

Examples of a compound that is the ionizing radiation-curable resin having two or more unsaturated bonds include a polyfunctional compound and the like such as trimethylolpropane tri(meth)acrylate, tripropylene glycol di(meth) acrylate, diethylene glycol di(meth)acrylate, dipropylene glycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentyl glycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobornyl di(meth)acrylate, dicyclopentane di(meth)acrylate, tricyclodecane di(meth) acrylate, and ditrimethylolpropane tetra(meth)acrylate. Among them, pentaerythritol triacrylate (PETA), dipentaerythritol hexaacrylate (DPHA), or pentaerythritol tetraacrylate (PETTA) is preferably used. In addition, "(meth) acrylate" refers to methacrylate and acrylate. As the ionizing radiation-curable resin, the above-mentioned compounds modified with propylene oxide (PO), ethylene oxide (EO), caprolactone (CL), or the like can also be used.

Examples of the thermoplastic resin used as the binder resin of the hard coat layer include styrene-based resins, (meth)acrylic-based resins, vinyl acetate-based resins, vinyl ether-based resins, halogen-containing resins, alicyclic olefin-based resins, polycarbonate-based resins, polyester-based resins, polyamide-based resins, cellulose derivatives, silicone-based resins, rubber, elastomer, and the like. The thermoplastic resin is preferably amorphous and soluble in an organic solvent (in particular, a common solvent capable of dissolving a plurality of polymers or curable compounds). In particular, from the viewpoint of transparency and weather resistance, styrene-based resins, (meth)acrylic-based resins, alicyclic olefin-based resins, polyester-based resins, cellulose derivatives (cellulose esters and the like), or the like is preferable.

Examples of the thermosetting resin used as the binder resin of the hard coat layer include a phenol resin, a urea resin, a diallyl phthalate resin, a melamine resin, a guanamine resin, an unsaturated polyester resin, a polyurethane resin, an epoxy resin, an aminoalkyd resin, a melamine-urea co-condensation resin, a silicon resin, a polysiloxane resin (including so-called silsesquioxane and the like in the form of cages, ladders, or the like), and the like.

The hard coat layer may contain an organic resin and an inorganic material, or may be an organic-inorganic hybrid material. Examples of the hard coat layer include a hard coat layer formed by a sol-gel method. Examples of the inorganic material include silica, alumina, zirconia, and titania. Examples of the organic material include an acrylic resin.

A filler contained in the hard coat layer can be selected from various fillers depending on the application of the optical laminate 10 from the viewpoints of an antiglare property, adhesion with the optical layer 13, which will be described later, and an antiblocking property. Specifically, for example, known particles such as silica (an oxide of Si) particles, alumina (aluminum oxide) particles, and organic fine particles can be used.

The hard coat layer may contain, for example, the binder resin and the silica particles and/or alumina particles as the filler. When the silica particles or alumina particles are dispersed in the hard coat layer as the filler, it is possible to form fine unevenness in a surface of the hard coat layer. These silica particles and/or alumina particles may be exposed on a surface of the hard coat layer on a side of the optical layer 13. In this case, the binder resin of the hard coat layer and the adhesion layer 12 provided below the optical layer 13 are bonded to each other. Therefore, the silica particles and/or alumina particles provide an auxiliary function in improving the adhesion between the hard coat layer and the optical layer 13, increasing a hardness of the hard coat layer, and improving the scratch resistance of the optical laminate 10.

An average particle size of the silica particles and/or alumina particles as the filler in the hard coat layer is, for example, 800 nm or less, preferably 780 nm or less, and more preferably 100 nm or less.

From the viewpoint of improving the antiglare property of the optical laminate 10, organic fine particles can be used as the filler contained in the hard coat layer. Examples of the organic fine particles include an acrylic resin and the like. The particle size of the organic fine particles is preferably 10 µm or less, more preferably 7 µm or less, even more preferably 5 µm or less, and particularly preferably 3 µm or less.

As the filler contained in the hard coat layer, various reinforcing materials can be used in order to impart toughness to the hard coat layer, as long as the optical properties are not impaired. Examples of the reinforcing materials include cellulose nanofibers.

Although the thickness of the hard coat layer is not particularly limited, for example, it is preferably 0.5 µm or more and more preferably 1 µm or more. The thickness of the hard coat layer is preferably 100 µm or less. When the thickness of the hard coat layer is 0.5 µm or more, a sufficient hardness is obtained, and thus scratches are less likely to occur during manufacturing. Further, when the thickness of the hard coat layer is 100 µm or less, the thickness and weight of the optical laminate 10 can be reduced. Further, when the thickness of the hard coat layer is 100 µm or less, microcracks in the hard coat layer, which occur when the optical laminate 10 is bent during manufacturing, are less likely to occur, resulting in good productivity.

The hard coat layer may be a single layer, or may be a laminate of multiple layers. Further, the hard coat layer may be further provided with known functions such as ultraviolet absorption performance, antistatic performance, a refractive index adjustment function, and a hardness adjustment function.

Moreover, the function provided to the hard coat layer may be provided to a single hard coat layer or may be provided to be divided into a plurality of layers.

The transparent substrate 11 is not limited to the resin film. The transparent substrate 11 may be glass, for example.

The glass may be a flat plate, or may have a shape having a convex or concave surface like a lens.

The adhesion layer 12 is a layer that adheres the transparent substrate 11 and the optical layer 13 to each other.

The adhesion layer 12 is made of a metal material having a melting point of 700° C. or less. The metal material may be a single metal or an alloy. Examples of the metal material include metals such as Al, Pb, Sn, In, Zn, and Bi. These metals may be single or alloys containing a plurality of elements. If the metal material is Al or the like, a natural oxide film is formed, but this naturally attributed film is treated as a metal film. In addition, in a case where the metal material is an alloy, a melting point of each of constituent elements contained in the alloy may be 700° C. or more as long as a composition of the formed film has a melting point of 700° C. or less. If a film thickness of the adhesion layer 12 is too small, it may not form a layer and its constituent atoms may be localized, and thus there is a possibility that light absorption occurs or the adhesion is impaired. Therefore, the film thickness of the adhesion layer 12 is preferably 0.5 nm or more. Moreover, if the film thickness of the adhesion layer 12 exceeds 8 nm, the absorption of light by the adhesion layer 12 becomes remarkable, and thus there is a possibility that the light transmittance of the optical laminate 10 is impaired. Therefore, the film thickness of the adhesion layer 12 is preferably in a range of 0.5 nm or more and 8 nm or less. More preferably, the film thickness of the adhesion layer 12 is in a range of 1 nm or more and 5 nm or less.

As a method for forming the adhesion layer 12, for example, a vacuum film formation method may be used. The method for forming the adhesion layer 12 is not particularly limited, but it is preferable to use a sputtering method for the purpose of obtaining the adhesion.

Normally, in the sputtering method, rare gas ions accelerated by plasma collide with an adhered material (a sputtering target) disposed on a cathode side, the adhered material jumps out into a space due to an impact applied, atoms of the adhered material collide with a surface of a substrate disposed to face the cathode, and a film is formed. At this time, it is known that the atoms move on the surface without immediately stopping on the substrate. As the atoms move, they lose energy and eventually adhere to the surface. Therefore, the greater the applied energy, the more the diffusion on the surface can be brought and the more uniform the film can be formed. However, in a case where the transparent substrate 11 is the resin film, when a large number of particles with too high energy collide with the transparent substrate 11, a thermal load increases, and the transparent substrate 11 itself may be deformed. This phenomenon becomes more remarkable as the thickness of the transparent substrate 11 becomes smaller.

In addition, in a case where a metal material having a high melting point is used as a sputtering target, when sputtering is performed at low electric power, sufficient energy cannot be obtained. As a result, metal atoms aggregate on the surface of the transparent substrate 11 to form fine metal particles. These fine metal particles may cause absorption of light.

The present inventors have conducted studies by forming a metal material film by the sputtering method using various metal materials and have found that all metal material films with excellent adhesion have a low melting point. That is, the present inventors have found that when a metal material having a melting point of 700° C. or less is used, even if the transparent substrate 11 is the resin film, it is possible to form a strong adhesion layer 12 without causing deformation due to thermal load.

In a case where the adhesion layer 12 is formed using a metal material having a melting point of 700° C. or less, less electric power is required to obtain the same film formation rate as compared with the case of using a metal material having a high melting point. Furthermore, even if a distance for the metal material to move from reaching the transparent substrate 11 to stopping on the substrate surface is long and the surface shape is complicated, a uniform film is formed with good followability.

Therefore, the optical layer 13 that is subsequently formed does not come into direct contact with the transparent substrate 11, but is bonded to the transparent substrate 11 via the adhesion layer 12 made of a metal material having a low melting point. As a result, strong adhesion can be obtained even in a case where the transparent substrate 11 is the resin film.

The melting point of the metal material used for the adhesion layer 12 is preferably 700° C. or less, but the melting point needs to be 100° C. or more from the viewpoint of a manufacturing process of the sputtering target.

The optical layer 13 is a layer for obtaining an optical effect, which is the purpose of the optical laminate 10. The optical effect is an effect of controlling properties of light such as reflection, transmission, and refraction, and examples of the optical effect include an antireflection effect, a selective reflection effect, an antiglare effect, a lens effect, and the like. In FIG. 1, the optical layer 13 is an alternate laminate in which two high refractive index layers 13a and two low refractive index layers 13b are alternately laminated. In FIG. 1, the number of layers of each of the high refractive index layers 13a and the low refractive index layers 13b are two, but there is no limit to the number of layers of each of the high refractive index layers 13a and the low refractive index layers 13b. Further, in the optical layer 13, it is possible to set a material, a configuration, and a film thickness of the layer to be laminated according to its purpose. The optical layer 13 may be a single layer.

In a case where the optical layer 13 is used as an anti-reflective layer, the configuration thereof may be an alternate laminate in which the high refractive index layers 13a having a refractive index of 1.9 or more and the low refractive index layers 13b having a refractive index of 1.6 or less are alternately laminated. In particular, the alternate laminate in which a first high refractive index layer 13a, a first low refractive index layer 13b, a second high refractive index layer 13a, and a second low refractive index layer 13b are laminated in that order from a side of the transparent substrate 11 is often used from the viewpoint of industrial productivity as well as ensuring sufficient optical properties. In general, the high refractive index layer 13a and the low refractive index layer 13b are each preferably transparent. In order to form the transparent high refractive index layer 13a and low refractive index layer 13b, it is preferable to form the high refractive index layer 13a and the low refractive index layer 13b using oxides. Of course, even if a layer having optical absorption is intentionally formed in order to realize an optical function, it does not deviate from the gist of the present invention. Further, a substance other than the oxide, such as an organic substance, may intervene with the intention of imparting functionality to a surface of the optical layer or a lamination interface excluding an interface with the substrate.

The refractive index of the high refractive index layer 13a is preferably 2.00 to 2.60, and more preferably 2.10 to 2.45.

Examples of such a high refractive index oxide include niobium oxide ($Nb_2O_5$, a refractive index 2.33), titanium oxide ($TiO_2$, a refractive index 2.33 to 2.55), tungsten oxide ($WO_3$, a refractive index 2.2), cerium oxide ($CeO_2$, a refractive index 2.2), tantalum pentoxide ($Ta_2O_5$, a refractive index 2.16), zinc oxide (ZnO, a refractive index 2.1), indium tin oxide (ITO, a refractive index 2.06), and the like.

The refractive index of the low refractive index layer 13b is preferably 1.20 to 1.60, and more preferably 1.30 to 1.50. As such a low refractive index oxide, an oxide containing $SiO_2$ (an oxide of Si) or the like as a main component can be used. The oxide containing the oxide of Si may contain up to 50% of another element. For example, Na may be contained for the purpose of improving durability, and Zr, Al, and N may be contained for the purpose of improving hardness. The content of these elements is preferably 10 atomic % or less.

The refractive indices of the low refractive index material layer and the high refractive index material layer can be checked using a spectroscopic ellipsometer.

By alternately laminating the high refractive index layers 13a and the low refractive index layers 13b, rays of the light incident from a surface side on a side opposite to the transparent substrate 11 interferes with each other, and thus it is possible to reduce the intensity of the reflected light and to exhibit the anti-reflective function.

The high refractive index layers 13a and the low refractive index layers 13b that constitute the optical layer 13 can be formed by the sputtering method, for example.

When the adhesion layer 12 and the optical layer 13 are formed by the sputtering method, for example, a thin film forming apparatus described in Japanese Unexamined Patent Application, First Publication No. 2014-34701 can be used. For example, this thin film forming apparatus includes a supply unit for taking out the transparent substrate 11 from an unwinding roll, a film forming chamber unit in which the adhesion layer 12 and the optical layer 13 are formed on the transparent substrate 11 (on the resin coating in a case where the resin coating is provided on a side of the optical layer 13) to manufacture the optical laminate 10, and a winding unit that winds the optical laminate 10, in a vacuum chamber (a chamber). The film forming chamber unit has a cathode part in which the sputtering target for forming the adhesion layer 12 and the optical layer 13 is installed. In a case where the adhesion layer 12 is one layer and the optical layer 13 is an alternate laminate in which two high refractive index layers 13a and two low refractive index layers 13b are alternately laminated (in a case where a total of five layers are formed), five cathode parts are used.

That is, the above-described thin film forming apparatus performs film formation by sputtering on the transparent substrate 11 such as the resin film by a roll-to-roll method. In the thin film forming apparatus, a plurality of sputtering targets can be installed, and once rolls are set, it is possible to form a film with a plurality of different pieces of material while maintaining the vacuum atmosphere. Furthermore, in the thin film forming apparatus described above, oxygen gas can be introduced into the plasma in addition to argon gas, which is a sputtering gas, during sputtering, thereby forming an oxide of the sputtering target material on the transparent substrate 11.

In the optical laminate 10 of the present embodiment, an antifouling layer may be provided on a surface of the optical layer 13 on a side opposite to a side of the adhesion layer 12. As a material for the antifouling layer, fluorine-based organic compounds can be used. Examples of the fluorine-based organic compounds include a compound including a fluorine-modified organic group and a reactive silyl group (for example, alkoxysilane). The fluorine-based organic compounds may be used singly or in combination of two or more.

Further, in the optical laminate 10 of the present embodiment, various layers may be provided on a surface of the transparent substrate 11 on a side opposite to a side of the adhesion layer 12, if necessary. For example, a pressure-sensitive adhesive layer that is used for bonding with other members may be provided. Moreover, another optical film may be provided via this pressure-sensitive adhesive layer. Examples of another optical film include a polarizing film, a retardation compensation film, a film functioning as a half-wavelength plate or a quarter-wavelength plate, and the like.

According to the optical laminate 10 of the present embodiment configured as described above, the adhesion layer 12 interposed between the transparent substrate 11 and the optical layer 13 is formed of the metal material having a melting point within the range of 100° C. or more and 700° C. or less, and thus the transparent substrate 11 and the optical layer 13 can be firmly adhered to each other. That is, the metal material having a melting point in the range of 100° C. or more and 700° C. or less can be formed into a film by the sputtering method with relatively low electric power. Therefore, even in a case where the transparent substrate 11 is the resin film, it is possible to form the metal material film (the adhesion layer 12) uniformly. When the adhesion layer 12 is uniformly formed on the surface of the transparent base material 11, the optical layer 13 is less likely to come into direct contact with the surface of the transparent base material 11, and the optical layer 13 is uniformly formed on the surface of the adhesion layer 12. Therefore, the adhesion between the transparent substrate 11 and the optical layer 13 is improved.

Further, in a case where the resin coating is provided on the transparent substrate 11, the same effect as described above in a case where the transparent substrate 11 is the resin film can be applied to the resin coating.

In the optical laminate 10 of the present embodiment, in a case where the thickness of the adhesion layer 12 is 0.5 nm or more, the transparent substrate 11 and the optical layer 13 can be adhered to each other more reliably. Further, in a case where the thickness of the adhesion layer 12 is 8 nm or less, the absorption of light by the adhesion layer 12 can be curbed to a level that poses no practical problem.

According to the optical laminate 10 of the present embodiment, even in a case where the transparent substrate 11 is the resin film and the optical layer 13 is the oxide layer, it is possible to firmly adhere them.

In the optical laminate 10 of the present embodiment, in a case where the optical layer 13 is the alternate laminate in which the high refractive index layers 13a and the low refractive index layers 13b are alternately laminated, it can be used as an antireflection film. In particular, in a case when the transmittance for light with a wavelength of 550 nm is 91% or more, it can be advantageously used as an antireflection film. More preferably, the optical laminate 10 has a transmittance of 92% or more for light with a wavelength of 550 nm.

An article of the present embodiment is, for example, a liquid crystal display panel, an organic EL display panel, or the like, in which the optical laminate 10 described above is provided on a display surface of an image display portion. As a result, for example, high wear resistance can be imparted to a touch panel display portion of a smartphone or operation device, and an image display device with excellent durability can be realized.

In addition, the article is not limited to an image display device, and the article may be any of a window glass or a goggle, a light receiving surface of a solar cell, a screen of a smartphone or a display of a personal computer, an information input terminal, a tablet terminal, an electronic display board, a glass table surface, a game machine, an operation support device for aircraft, a train, or the like, a navigation system, an instrument panel, an optical sensor surface, and the like on which the optical laminate of the present embodiment is provided on a surface and to which the optical laminate 10 is applicable.

Although the embodiment of the present invention has been described above, this embodiment is presented as an example and is not intended to limit the scope of the invention. This embodiment can be implemented in various other forms, and various omissions, replacements, and modifications can be made without departing from the scope of the invention. These embodiments and their modifications are included in the scope and spirit of the invention, as well as the scope of the invention described in the claims and equivalents thereof.

EXAMPLES

The present invention will be specifically described below with reference to examples and comparative examples, but the present invention is not limited to the following examples.

Example 1

As the transparent substrate 11, a resin film obtained by forming an acrylic resin coating (a hard coat layer) of 4 μm thickness containing silicon oxide fine particles on TAC of 80 μm thickness was prepared. The adhesion layer 12 and the optical layer 13 were sequentially formed on the acrylic resin coating of this resin film by a sputtering method using a thin film forming apparatus.

The acrylic resin coating was formed by a method applying a coating liquid having a composition shown in Table 1 below onto the transparent substrate 11 using a bar coater and irradiating the coating liquid with ultraviolet rays for photopolymerization to cure the coating liquid.

TABLE 1

| | Product name | Manufacturer | Structure | Blend ratio |
|---|---|---|---|---|
| Ionizing radiation-curable resin | CN968 | Sartomer | Hexafunctional aliphatic urethane acrylate having polyester skeleton | 8% |
| | SR444 | Sartomer | Pentaerythritol triacrylate | 7% |
| | SR610 | Sartomer | Polyethylene glycol (600) diacrylate (polyethylene glycol chain molecular weight: about 600) | 11% |
| Silica particle | IPA-ST-L | Nissan Chemical Corporation | Silica sol (particle size 40 to 50 nm, solvent IPA, solid component 30%) | 37% |
| Ultraviolet curing initiator | Irgacure 184 | BASF | Hydroxycyclohexyl phenyl ketone | 2% |
| Solution | PGMA | | Propylene glycol monomethyl ether acetate | 30% |
| | Butyl acetate | | | 5% |
| Total | | | | 100% |
| Levelling agent | BYK377 | BYK | Polyether-modified, hydroxy-functional polydimethylsiloxane | 0.01 parts by weight per above total 100 parts by weight |

As the thin film forming apparatus, an apparatus described in Japanese Unexamined Patent Application, First Publication No. 2014-34701 was used. This thin film forming apparatus can sequentially laminate thin films of a plurality of pieces of material at the same time. In the present example, sputtering targets of aluminum, niobium oxide, silicon, niobium oxide, and silicon were disposed in that order from a side closer to an unwinding side of the resin film. Each sputtering target is connected to an independent power supply and can be discharged by supplying arbitrary electric power. In addition, each sputtering target is stored in an independent container, and partition walls partitioning the sputtering targets each have only a slight gap near a can roll and are able to realize substantially different gas atmospheres.

The entire vacuum chamber of this thin film forming apparatus was evacuated to $1 \times 10^{-3}$ Pa or less. Next, argon gas was introduced into a first cathode part in which the aluminum target was installed while a flow rate is adjusted by a mass flow controller such that the flow rate was 150 sccm, and electric power was applied to the aluminum target to discharge it, and thus a film was formed by sputtering. At this time, the running speed of the resin film was 3 m/min. The electric power applied to the aluminum target was adjusted such that an aluminum film having a film thickness of 0.5 nm could be formed on the resin film of which a running speed is 3 m/min by measuring a relationship between the electric power and the film thickness of the formed aluminum film in advance.

After the aluminum film (the adhesion layer) was formed in the first cathode part, a niobium oxide film (the high refractive index layer 13*a*) was formed in a second cathode part. Argon gas was introduced into the second cathode part while a flow rate is adjusted by the mass flow controller such that the flow rate was 150 sccm, and electric power was applied to the niobium oxide target to discharge it, and thus a film was formed by sputtering. At this time, a small amount of oxygen was introduced separately from the argon gas while being adjusted by the mass flow controller, and the amount of oxygen was adjusted not to cause light absorption due to lack of oxygen, thereby obtaining an excellent niobium oxide film. The electric power applied to the niobium oxide target was adjusted such that a niobium oxide layer having a film thickness of 10 nm (a refractive index at a wavelength of 550 nm is 2.33) could be formed on the resin film of which a running speed is 3 m/min by measuring a relationship between the electric power and the film thickness of the formed niobium oxide film in advance.

After the niobium oxide film (the high refractive index layer) was formed in the second cathode part, a silicon oxide film (a refractive index at a wavelength of 550 nm is 1.45) (the low refractive index layer) was formed in a third cathode part. Argon gas was introduced into the third cathode part while a flow rate is adjusted by the mass flow controller such that the flow rate was 150 sccm, and electric power was applied to the silicon target to discharge it, and thus a film was formed by sputtering. At this time, oxygen was introduced separately from the argon gas while being adjusted by the mass flow controller, thereby obtaining an excellent silicon oxide film. The electric power applied to the silicon target was adjusted such that a silicon oxide film having a film thickness of 40 nm could be formed on the resin film of which a running speed is 3 m/min by measuring a relationship between the electric power and the film thickness of the formed silicon oxide film in advance.

Similarly, a niobium oxide film was formed in a fourth cathode part, and then a silicon oxide film was formed in a fifth cathode part. At that time, the electric power was adjusted such that the film thickness of the niobium oxide film was 100 nm in the fourth cathode part and the film thickness of the silicon oxide film was 90 nm in the fifth cathode part.

As described above, one adhesion layer 12 and the optical layer, which is an alternate laminate in which four high refractive index layers and low refractive index layers are alternately laminated, are formed on the resin film to manufacture the optical laminate (the antireflection film) having the configuration shown in FIG. 1. After the optical laminate was continuously wound up, the air was introduced into the entire vacuum chamber of the thin film forming apparatus, and the wound optical laminate was taken out.

Although one layer was formed using one cathode in the present embodiment, it is not necessary to use one cathode. A single layer may be formed using a plurality of cathodes in consideration of a thermal load and an electric power load.

Example 2

An optical laminate was manufactured under the same conditions as in Example 1, except that in the first cathode part, the film thickness of the aluminum film (the adhesion layer) was adjusted to 1 nm.

Example 3

An optical laminate was manufactured under the same conditions as in Example 1, except that in the first cathode part, the film thickness of the aluminum film (the adhesion layer) was adjusted to 2 nm.

Example 4

An optical laminate was manufactured under the same conditions as in Example 1, except that in the first cathode part, the film thickness of the aluminum film (the adhesion layer) was adjusted to 4 nm.

Example 5

An optical laminate was manufactured under the same conditions as in Example 1, except that in the first cathode part, the film thickness of the aluminum film (the adhesion layer) was adjusted to 6 nm.

Example 6

An optical laminate was manufactured under the same conditions as in Example 1, except that in the first cathode part, the film thickness of the aluminum film (the adhesion layer) was adjusted to 8 nm.

Example 7

An optical laminate was manufactured under the same conditions as in Example 1, except that in the first cathode part, a zinc target is used in place of the aluminum target and a film thickness of a zinc film (the adhesion layer) was adjusted to 2 nm.

Example 8

An optical laminate was manufactured under the same conditions as in Example 1, except that in the first cathode part, a tin target is used in place of the aluminum target and a film thickness of a tin film (the adhesion layer) was adjusted to 2 nm.

Example 9

An optical laminate was manufactured under the same conditions as in Example 1, except that in the first cathode part, an indium target is used in place of the aluminum target and a film thickness of an indium film (the adhesion layer) was adjusted to 2 nm.

Comparative Example 1

An optical laminate was manufactured under the same conditions as in Example 1, except that in the first cathode part, the cathode part was not discharged and the aluminum film was not formed.

Comparative Example 2

An optical laminate was manufactured under the same conditions as in Example 1, except that in the first cathode part, a titanium target is used in place of the aluminum target and a film thickness of a titanium film (the adhesion layer) was adjusted to 1 nm.

Comparative Example 3

An optical laminate was manufactured under the same conditions as in Example 1, except that in the first cathode part, a titanium target is used in place of the aluminum target and a film thickness of a titanium film (the adhesion layer) was adjusted to 2 nm.

Comparative Example 4

An optical laminate was manufactured under the same conditions as in Example 1, except that in the first cathode part, a titanium target is used in place of the aluminum target and a film thickness of a titanium film (the adhesion layer) was adjusted to 3 nm.

Comparative Example 5

An optical laminate was manufactured under the same conditions as in Example 1, except that in the first cathode part, a titanium target is used in place of the aluminum target and a film thickness of a titanium film (the adhesion layer) was adjusted to 4 nm.

Comparative Example 6

An optical laminate was manufactured under the same conditions as in Example 1, except that in the first cathode part, a silver target is used in place of the aluminum target and a film thickness of a silver film (the adhesion layer) was adjusted to 2 nm.

Comparative Example 7

An optical laminate was manufactured under the same conditions as in Example 1, except that in the first cathode part, a silver target is used in place of the aluminum target and a film thickness of a silver film (the adhesion layer) was adjusted to 4 nm.

Comparative Example 8

An optical laminate was manufactured under the same conditions as in Example 1, except that in the first cathode part, a germanium target is used in place of the aluminum target and a film thickness of a germanium film (the adhesion layer) was adjusted to 2 nm.

Comparative Example 9

An optical laminate was manufactured under the same conditions as in Example 1, except that in the first cathode part, a germanium target is used in place of the aluminum target and a film thickness of a germanium film (the adhesion layer) was adjusted to 4 nm.

Comparative Example 10

An optical laminate was manufactured under the same conditions as in Example 1, except that in the first cathode part, a tungsten target is used in place of the aluminum target and a film thickness of a tungsten film (the adhesion layer) was adjusted to 2 nm.

Comparative Example 11

An optical laminate was manufactured under the same conditions as in Example 1, except that in the first cathode part, a tungsten target is used in place of the aluminum target and a film thickness of a titanium film (the adhesion layer) was adjusted to 4 nm.

Comparative Example 12

An optical laminate was manufactured under the same conditions as in Example 1, except that in the first cathode part, an indium target is used in place of the aluminum target and a film thickness of an indium film (the adhesion layer) was adjusted to 10 nm.

[Evaluation Results]

The following measurements and evaluations were performed on samples manufactured by cutting the optical laminates obtained in the examples and the comparative Examples into an arbitrary size. The results are shown in Table 2 below together with the metal material constituting the adhesion layer, the bulk melting point of the metal, and the film thickness of the adhesion layer.

(Total Light Transmittance)

The total light transmittance was measured using "NDH5000" (manufactured by Nippon Denshoku Industries Co., Ltd.) in accordance with "JIS K-7105." In the present invention, it is preferable that light absorption by the adhesion layer be small. Therefore, in the case of the optical laminates (the antireflection films) manufactured in the examples and the comparative examples, it is desirable that the total light transmittance be high. Since a TAC film in which the antireflection film is not used has a transmittance of about 90%, in order to exhibit a function as the antireflection film, it is desirable that the antireflection film be applied to have a total light transmittance of 91% or more.

(Adhesion)

The adhesion was evaluated by a cross-hatch method in accordance with "JIS K5400." That is, 11 cuts were made at intervals of 1 mm on a surface of the sample on a side of the optical laminate with a cutter, and 11 cuts were made to be perpendicular to the above cuts to form 100 squares. The sample with the squares formed thereon is allowed to stand for 2 hours under conditions of a temperature of 25° C. and a relative humidity of 60% RH. Then, a pressure-sensitive adhesive tape is adhered to the squares without air bubbles therebetween, and in that state, the pressure-sensitive adhesive tape is peeled off at one time. This is repeated three times, and the number of squares peeled off is counted with an optical microscope or the like. If one-third or more of the squares are peeled off, it is regarded as being peeled off. The number of squares remaining without being peeled off (the number of residuals) is measured, and the number of peeled-off squares relative to the total number of squares (100 squares) is used as an index of the adhesion.

In the optical laminate, not only durability in an initial period immediately after the manufacture but also long-term durability is important. For this reason, an environmental test in which the sample was allowed to stand for 500 hours in an environment of a temperature of 85° C. and a relative humidity of 85% RH was conducted, and the adhesion of the sample in the environmental test was similarly evaluated.

It is preferable that the adhesion be high, and it is desirable that the number of squares remaining without being peeled off (the number of residuals) in the cross-hatch method be large.

TABLE 2

|  | Adhesion layer | | | Evaluation | |
|---|---|---|---|---|---|
|  | Material | Bulk melting point (°C) | Film thickness (nm) | Total light transmittance (%) | Adhesion properties in initial period (the number of residuals/ total number) | Adhesion properties after environmental test (the number of residuals/total number) |
| Example 1 | Al | 660 | 0.5 | 94.4 | 100/100 | 100/100 |
| Example 2 | Al | 660 | 1 | 94.6 | 100/100 | 100/100 |
| Example 3 | Al | 660 | 2 | 94.6 | 100/100 | 100/100 |
| Example 4 | Al | 660 | 4 | 93.4 | 100/100 | 100/100 |
| Example 5 | Al | 660 | 6 | 92.6 | 100/100 | 100/100 |
| Example 6 | Al | 660 | 8 | 91.5 | 100/100 | 100/100 |
| Example 7 | Zn | 420 | 2 | 94.5 | 100/100 | 100/100 |
| Example 8 | Sn | 232 | 2 | 94.4 | 100/100 | 100/100 |
| Example 9 | In | 157 | 2 | 95.0 | 100/100 | 100/100 |
| Comparative example 1 | None | — | — | 90.8 | 58/100 | — |
| Comparative example 2 | Ti | 1668 | 1 | 94.8 | 100/100 | 23/100 |
| Comparative example 3 | Ti | 1668 | 2 | 94.1 | 100/100 | 36/100 |
| Comparative example 4 | Ti | 1668 | 3 | 92.3 | 100/100 | 48/100 |
| Comparative example 5 | Ti | 1668 | 4 | 90.9 | 100/100 | 60/100 |
| Comparative example 6 | Ag | 962 | 2 | 85.9 | 90/100 | — |
| Comparative example 7 | Ag | 962 | 4 | 92.2 | 100/100 | 12/100 |
| Comparative example 8 | Ge | 938 | 2 | 94.3 | 100/100 | 70/100 |
| Comparative example 9 | Ge | 938 | 4 | 92.8 | 100/100 | 84/100 |
| Comparative example 10 | W | 3422 | 2 | 93.8 | 92/100 | — |
| Comparative example 11 | W | 3422 | 4 | 92.7 | 100/100 | 87/100 |
| Comparative example 12 | In | 157 | 10 | 87.0 | 100/100 | 100/100 |

As is clear from Table 2, in the optical laminates of Examples 1 to 6 in which the aluminum film having a bulk melting point of 660° C. is used as the adhesion layer, the total light transmittance changes depending on the film thickness of the adhesion layer, but the total light transmittance is 91% or more in the range of the film thickness of 0.5 to 8 nm, and thus it can be said that the optical laminates are excellent. In addition, it can be said that the adhesion in the initial period and after the environmental test is sufficient. In the optical laminates of Example 7, Example 8, and Example 9 in which the zinc film (the bulk melting point is 420° C.), the tin film (the bulk melting point is 232° C.), and the indium film (the bulk melting point is 157° C.), which each have a lower melting point than the aluminum film, are each used as the adhesion layer, excellent results in both total light transmittance and adhesion were shown.

The above results show that when a metal material with a melting point of 700° C. or less is used, a uniform metal material film is formed on the surface of the resin film at the time of forming the adhesion layer, and both excellent optical properties and adhesion can be achieved.

The optical laminate of Comparative Example 1 in which no adhesion layer was formed has a low total light transmittance, but this is presumed to be due to the fact that moisture released from the resin film affected the optical layer to form lower oxides. In addition, it was checked that the optical laminate of Comparative Example 1 was poor in adhesion, as the peeling-off was observed even in the initial period. Therefore, the environmental test was omitted.

In the optical laminates of Comparative Examples 2 to 5 in which the titanium film having a bulk melting point of 1668° C. is used as the adhesion layer, the adhesion in the initial period could be secured. However, the adhesion after the environmental test was insufficient. Although the adhesion was improved by increasing the film thickness of the adhesion layer, there was a tendency that the total light transmittance decreases as the film thickness of the adhesion layer increases. For this reason, it was not possible to find a condition that satisfies both the total light transmittance and the adhesion after the environmental test.

As for the optical laminates 10 of Comparative Examples 6 and 7 in which the silver film having a bulk melting point of 962° C. is used as the adhesion layer, in Comparative example 6 in which the film thickness of the adhesion layer is 2 nm, both the adhesion in the initial period and the total light transmittance were low. This is probably because silver is likely to aggregate. Therefore, in Comparative Example 6, the environmental test was omitted. On the other hand, in the optical laminate of Comparative Example 7 having a film thickness of 4 nm, the adhesion in the initial period and the total light transmittance were allowable, but the adhesion after the environmental test was insufficient.

In the optical laminates of Comparative Examples 8 and 9 in which the germanium film having a bulk melting point of 938° C. is used as the adhesion layer, the total light transmittance and the adhesion in the initial period could be secured. However, the adhesion after the environmental test was low in both cases.

In the optical laminates of Comparative Examples 10 and 11 in which the tungsten film having a bulk melting point of 3422° C. is used as the adhesion layer, the total light transmittance could be secured. However, in Comparative Example 10 in which the film thickness of the adhesion layer is 2 nm, the adhesion in the initial period was low. Therefore, the environmental test was omitted. Further, in Comparative Example 11 in which the film thickness of the adhesion layer is 4 nm, the adhesion after the environmental test was low.

In Comparative Example 12 in which the indium film having a bulk melting point of 157° C. and a thickness of 10 nm is used as the adhesion layer, the total light transmittance was less than 91%. This indicates that light absorption is affected by the thickness of the adhesion layer, and if the thickness of the adhesion layer exceeds 8 nm, it is practically disadvantageous.

As described above, the effects of the present invention could be demonstrated from the results of Examples and Comparative Examples.

REFERENCE SIGNS LIST

10 Optical laminate
11 Transparent substrate
12 Adhesion layer
13 Optical layer
13a High refractive index layer
13b Low refractive index layer

What is claimed is:

1. An optical laminate comprising:
   a transparent substrate;
   a resin coating provided on at least one surface of the transparent substrate, the resin coating comprising a resin matrix and particles dispersed in the resin matrix;
   an adhesion layer provided on a surface of the resin coating; and
   an optical layer provided on a surface of the adhesion layer on a side opposite to the transparent substrate, wherein,
   the adhesion layer is formed of a metal selected from the group consisting of Al and In,
   the particles in the resin matrix are metal oxide particles,
   there are no particles present in the resin matrix which are an oxide of the same metal as the adhesion layer,
   the adhesion layer has a thickness of 1 nm or more and 8 nm or less, and
   the optical layer is an oxide layer.

2. The optical laminate according to claim 1, wherein the optical laminate has a transmittance of 91% or more for light with a wavelength of 550 nm.

3. The optical laminate according to claim 1, wherein the particles in the resin matrix are made of silica.

4. The optical laminate according to claim 1, wherein the particles in the resin matrix are not exposed on a surface of the resin coating.

5. An article comprising the optical laminate according to claim 1.

6. The article according to claim 5, wherein the optical laminate has a transmittance of 91% or more for light with a wavelength of 550 nm.

7. The optical laminate according to claim 1, wherein the optical layer is an alternate laminate having four or more layers in which high refractive index layers and low refractive index layers are alternately laminated.

8. The optical laminate according to claim 7, wherein the optical laminate has a transmittance of 91% or more for light with a wavelength of 550 nm.

9. The optical laminate according to claim 7, wherein one high refractive index layer in the high refractive index layers is provided on the surface of the adhesion layer on the side opposite to the transparent substrate.

10. The optical laminate according to claim 9, wherein the optical laminate has a transmittance of 91% or more for light with a wavelength of 550 nm.

11. The optical laminate according to claim 1, wherein the transparent substrate is a resin film.

12. The optical laminate according to claim 11, wherein the optical laminate has a transmittance of 91% or more for light with a wavelength of 550 nm.

13. The optical laminate according to claim 11, wherein the optical layer is an alternate laminate having four or more layers in which high refractive index layers and low refractive index layers are alternately laminated.

14. The optical laminate according to claim 13, wherein the optical laminate has a transmittance of 91% or more for light with a wavelength of 550 nm.

15. The optical laminate according to claim 13, wherein one high refractive index layer in the high refractive index layers is provided on the surface of the adhesion layer on the side opposite to the transparent substrate.

16. The optical laminate according to claim 15, wherein the optical laminate has a transmittance of 91% or more for light with a wavelength of 550 nm.

17. An optical laminate comprising:
   a transparent substrate;
   a resin coating provided on at least one surface of the transparent substrate, the resin coating comprising a resin matrix and particles dispersed in the resin matrix;
   an adhesion layer provided on a surface of the resin coating; and
   an optical layer provided on a surface of the adhesion layer on a side opposite to the transparent substrate, wherein,
   the adhesion layer is formed of a metal selected from the group consisting of Al and In,
   the particles in the resin matrix are metal oxide particles,
   there are no particles present in the resin matrix which are an oxide of the same metal as the adhesion layer,
   the adhesion layer has a thickness of 1 nm or more and 8 nm or less,
   the optical layer is an alternate laminate in which high refractive index layers and low refractive index layers are alternately laminated, and
   one high refractive index layer formed of niobium oxide is provided on the surface of the adhesion layer on the side opposite to the transparent substrate.

18. The optical laminate according to claim 17, wherein the optical laminate has a transmittance of 91% or more for light with a wavelength of 550 nm.

19. The optical laminate according to claim 17, wherein the particles in the resin matrix are made of silica.

20. The optical laminate according to claim 17, wherein the particles in the resin matrix are not exposed on a surface of the resin coating.

* * * * *